United States Patent
Hasberg et al.

(10) Patent No.: US 12,380,704 B2
(45) Date of Patent: Aug. 5, 2025

(54) METHOD FOR TRAINING AN ARTIFICIAL NEURAL NETWORK

(71) Applicant: Robert Bosch GmbH, Stuttgart (DE)

(72) Inventors: Carsten Hasberg, Ilsfeld-Auenstein (DE); Tayyab Naseer, Milton Keynes (GB); Piyapat Saranrittichai, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 485 days.

(21) Appl. No.: 17/997,585

(22) PCT Filed: May 4, 2021

(86) PCT No.: PCT/EP2021/061716
§ 371 (c)(1),
(2) Date: Oct. 31, 2022

(87) PCT Pub. No.: WO2021/224249
PCT Pub. Date: Nov. 11, 2021

(65) Prior Publication Data
US 2023/0169778 A1    Jun. 1, 2023

(30) Foreign Application Priority Data

May 4, 2020   (DE) .................... 10 2020 205 581.5

(51) Int. Cl.
*G06V 20/58* (2022.01)
*G06V 10/28* (2022.01)
*G06V 10/82* (2022.01)

(52) U.S. Cl.
CPC .............. *G06V 20/58* (2022.01); *G06V 10/28* (2022.01); *G06V 10/82* (2022.01)

(58) Field of Classification Search
CPC ........ G06V 20/58; G06V 10/28; G06V 10/82; G06N 3/045; G06N 3/084; G06T 2207/20084
See application file for complete search history.

(56) References Cited

U.S. PATENT DOCUMENTS

| | | | |
|---|---|---|---|
| 2018/0174047 A1* | 6/2018 | Bourdev | G06V 10/82 |
| 2019/0258878 A1* | 8/2019 | Koivisto | G06V 10/46 |
| 2020/0099954 A1* | 3/2020 | Hemmer | G06T 9/004 |

OTHER PUBLICATIONS

International Search Report corresponding to PCT Application No. PCT/EP2021/061716, mailed Oct. 13, 2021 (German and English language document) (7 pages).

(Continued)

*Primary Examiner* — Fayyaz Alam
(74) *Attorney, Agent, or Firm* — Maginot, Moore & Beck LLP

(57) ABSTRACT

A method for training an artificial neural network uses training data that include first image data of a first image and second image data of a second image of an infrastructure. The first image includes a first feature, and the second image includes a second feature corresponding to the first image. The training data include a relative desired translation and a relative desired rotation between the first feature and the second feature. The training includes extracting the first feature from the first image and extracting the second feature from the second image using the artificial neural network. The extracted first feature is represented by first feature data having a first volume of data. The extracted second feature is represented by second feature data having a second volume of data. The training further includes ascertaining a relative translation and a relative rotation between the extracted first feature and the extracted second.

12 Claims, 3 Drawing Sheets

(56) References Cited

OTHER PUBLICATIONS

Figure 1:
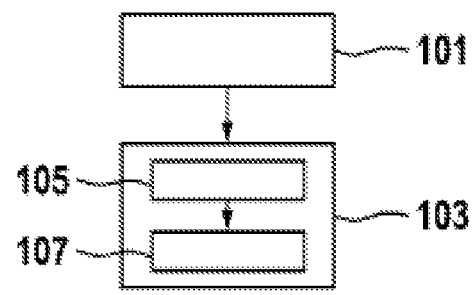

Kendall et al., "Geometric Loss Functions for Camera Pose Regression with Deep Learning," 2017 IEEE Conference on Computer Vision and Pattern Recognition (CVPR), IEEE Computer Society, US, Jul. 21, 2017, pp. 5974-5983, DOI: 10.1109/CVPR.2017.694, ISSN: 1063-6919, XP033250020 (10 pages).

Lohdefink et al., "On Low-Bitrate Image Compression for Distributed Automotive Perception: Higher Peak SNR Does Not Mean Better Semantic Segmentation," 2019 IEEE Intelligent Vehicles Symposium (IV), IEEE, Jun. 9, 2019, pp. 424-431, DOI: 10.1109/IVS.2019.8813813, XP033605947 (9 pages).

Suzuki et al., "Image Pre-Transformation for Recognition-Aware Image Compression," 2019 IEEE International Conference on Image Processing (ICIP), IEEE, Sep. 22, 2019, pp. 2686-2690, DOI: 10.1109/ICIP.2019.8803275, XP033647230 (5 pages).

\* cited by examiner

METHOD FOR TRAINING AN ARTIFICIAL NEURAL NETWORK

This application is a 35 U.S.C. § 371 National Stage Application of PCT/EP2021/061716, filed on May 4, 2021, which claims the benefit of priority to Serial No. DE 10 2020 205 581.5, filed on May 4, 2020 in Germany, the disclosures of which are incorporated herein by reference in their entirety.

BACKGROUND

When the same scene is acquired by means of a respective surroundings sensor of multiple motor vehicles, the images corresponding to said acquisition typically overlap. Respective identical features of the images are typically offset.

An artificial neural network can be used to extract features from the respective images in the motor vehicles, for example.

The extracted features can be sent from the motor vehicles to a remote server, for example, which can be part of a cloud infrastructure. The server can align the features, for example to create a digital map. An algorithm in the cloud can use the features to align the individual trips of the motor vehicles based on the extracted features.

To do that, it is necessary, on the one hand, that the features to be sent are suitable for efficient alignment. On the other hand, a data volume of the features to be sent should not be too large, because bandwidth is usually limited.

SUMMARY

The disclosure provides a concept for efficiently training an artificial neural network.

According to a first aspect, a method for training an artificial neural network is provided, which comprises the following steps: receiving training data signals comprising training data for training the artificial neural network, wherein the training data comprises first image data of a first image of an infrastructure and second image data of a second image of the infrastructure, wherein the first image comprises a first feature and wherein the second image comprises a second feature corresponding to the first image, wherein the training data comprises a relative target translation and a relative target rotation between the first feature and the second feature,
    training the artificial neural network on the basis of the training data, wherein the training comprises the following steps:
    extracting the first feature from the first image and the second feature from the second image by means of the artificial neural network, wherein the extracted first feature is represented by first feature data having a first data volume and wherein the extracted second feature is represented by second feature data having a second data volume, ascertaining a relative translation and a relative rotation between the extracted first feature and the extracted second feature by means of the artificial neural network, wherein the artificial neural network is trained until a loss function that is dependent on the pose of the feature and on the first and/or second data volume is at a minimum or is less than or less than or equal to a predefined loss function threshold value.

According to a second aspect, an artificial neural network is provided, which is trained by means of the method according to the first aspect.

According to a third aspect, a method for extracting a feature from an image of surroundings of a motor vehicle is provided, which comprises the following steps:
    receiving image data signals which represent image data of an image of the surroundings of the motor vehicle,
    extracting a feature from the image by means of the artificial neural network according to the second aspect,
    outputting feature signals which represent the extracted feature.

According to a fourth aspect, a device is provided, which is configured to carry out all steps of the method according to the first aspect and/or according to the third aspect.

According to a fifth aspect, a computer program is provided, which comprises instructions that, when the computer program is executed by a computer, for example by the device according to the fourth aspect, prompt said computer to carry out a method according to the first aspect and/or according to the third aspect.

According to a sixth aspect, a machine-readable storage medium is provided, on which the computer program according to the fifth aspect and/or the artificial neural network according to the second aspect is stored.

The disclosure is based on and includes the realization that the above object can be achieved in that the loss function depends not only the pose of the feature, but also on a data volume of feature data describing the extracted feature.

This, for example, produces the technical advantage that extracting features from images by means of the trained artificial neural network is optimized not only for suitability of the extracted features for efficient alignment, but also for the smallest possible data volume.

Consequently, a bandwidth for sending an extracted feature can be utilized efficiently, while at the same time a remote server can efficiently align the extracted features.

This in particular produces the technical advantage that a concept for efficiently training an artificial neural network is provided.

In one embodiment it is provided that the artificial neural network comprises a CNN (convolutional neural network) and an FCN (fully connected network), wherein an output of the CNN is connected to an input of the FCN, wherein the first and the second image data are provided to an input of the CNN. FCN can be translated into German as "fully connected neural network." CNN can be translated into German as a "convolutional neural network."

This, for example, produces the technical advantage that the features can be extracted efficiently.

In one embodiment it is provided that the extracted features are quantized such that the first and the second feature data are integers.

This, for example, produces the technical advantage that the data can be efficiently transformed into a format, which is used, for example, to send the extracted features from the motor vehicle to a remote server via a communication network in an embodiment of the method according to the third aspect.

This, for example, furthermore produces the technical advantage that the data volume of the feature data can be determined efficiently.

According to one embodiment, said quantization involves a soft quantization. In English, "soft quantization" is used for "soft quantization." An example of a soft quantization can be found in F. Mentzer, E. Agustsson, M. Tschannen, R. Timofte and L. V. Gool, "Conditional Probability Models for Deep Image Compression," IEEE Conference on Computer Vision and Pattern Recognition (CVPR), 2018, for example.

In one embodiment, it is provided that the loss function is defined by the following mathematical equation: $L_{total} = L_{pose} + L_{data\ volume}$, wherein $L_{total}$ is the loss function, wherein $L_{pose}$ is a loss function related to the pose of the feature, where $L_{data\ volume}$ is a loss function related to the first data volume of the first feature data and/or related to the second data volume of the second feature data.

This, for example, produces the technical advantage that the loss function is efficiently defined.

In one embodiment it is provided that $L_{data\ volume} = \gamma \mathbb{E}[H(z)]$, wherein $\gamma$ is a first parameter, wherein $\mathbb{E}$ is an expected value, wherein z is the first and/or second feature data, wherein $H(z)$ is the first and/or second data volume.

This, for example, produces the technical advantage that the loss function related to the first and/or second data volume is efficiently defined.

In one embodiment it is provided that $L_{pose} = \mathbb{E}[\|\Delta t_{target} - \Delta t_{determined}\|_2] + \beta \mathbb{E}[\|\Delta q_{target} - \Delta q_{determined}\|_2]$, wherein $\mathbb{E}$ is an expected value, wherein $\Delta t_{target}$ is the relative target translation, wherein $\Delta t_{determined}$ is the relative translation, wherein $\beta$ is a hyperparameter, wherein $\Delta t_{target}$ is the relative target rotation, wherein $\Delta q_{determined}$ is the relative rotation.

This, for example, produces the technical advantage that the loss function related to the pose is efficiently defined.

In one embodiment it is provided that $L_{pose} = \mathbb{E}[\|\Delta t_{target} - \Delta t_{determined}\|_1]e^{-s_t} + s_t + \mathbb{E}[\|\Delta q_{target} - \Delta q_{determined}\|_1]e^{-s_q} + s_q$, wherein $\mathbb{E}$ is an expected value, wherein $\Delta t_{target}$ is the relative target translation, wherein $\Delta t_{determined}$ is the relative translation, wherein $\Delta q_{target}$ is the relative target rotation, wherein $\Delta q_{determined}$ is the relative rotation, wherein $s_t$ is a second parameter, wherein $s_q$ is a third parameter.

This, for example, produces the technical advantage that the loss function related to the pose is efficiently defined. Such a loss function is in particular especially robust.

In one embodiment, it is provided that training the artificial neural network comprises training of the second and/or the third parameter.

This, for example, produces the technical advantage that the second and/or third parameters can be determined efficiently.

According to one embodiment, the hyperparameters or the parameters weight the individual components of the loss function L against one another. They are in particular treated during training. In other words, they can in particular be trained.

In one embodiment, an image is an element selected from the following group of images: video image, ultrasound image, LiDAR image, radar image, infrared image, magnetic field image.

According to one embodiment, infrastructure comprises one or more infrastructure elements.

According to one embodiment, an infrastructure element is an element selected from the following group of infrastructure elements: street, sidewalk, buildings, traffic signal, street lamp, post, bridge, parking lot, road sign.

According to one embodiment, infrastructure comprises a traffic infrastructure for vehicles, in particular motor vehicles.

According to one embodiment, a feature is an infrastructure element.

According to one embodiment, a feature is a natural element, for example a tree, a bush, a hedge.

The second feature corresponding to the first feature means that it is the same feature.

According to one embodiment, it is provided that the method according to the first and/or according to the third aspect is a computer-implemented method.

According to one embodiment, it is provided that the method according to the first aspect and/or according to the second aspect is executed or carried out by means of the device by means of the fourth aspect.

Device features result analogously from corresponding method features and vice versa. This means in particular that technical functionalities of the device according to the second aspect result analogously from corresponding technical functionalities of the method according to the first aspect and/or according to the third aspect and vice versa.

The German abbreviation "bzw." is "respectively" which is in particular "or rather."

The formulation "or rather" stands in particular for "and/or."

The pose is in particular defined or determined by the relative rotation and the relative translation. This means in particular that the pose is dependent on the relative rotation and the relative translation.

The pose ascertained by means of the artificial neural network is in particular defined or determined by the relative rotation ascertained by means of the artificial neural network and the relative translation ascertained by means of the artificial neural network. This means in particular that the pose depends on the relative rotation ascertained by means of the artificial neural network and the relative translation ascertained by means of the artificial neural network.

The target pose is in particular defined or determined by the relative target rotation and the relative target translation. This means in particular that the target pose is dependent on the relative target rotation and the relative target translation.

When the general term "pose" is used, it includes the following formulation "target pose and/or pose ascertained by means of the artificial neural network."

When the general term "feature data" is used, it includes the following formulation "first and/or second feature data."

When the general term "feature" is used, it includes the following formulation "first and/or second feature."

When the general term "data volume" is used, it includes the following formulation "first and/or second data volume."

The data volume can also be referred to as entropy.

According to one embodiment, the motor vehicle is configured to be guided in an at least partially automated manner.

According to one embodiment, the motor vehicle comprises one or more surroundings sensors.

According to one embodiment, a surroundings sensor is one of the following surroundings sensors: radar sensor, video sensor, ultrasound sensor, LiDAR sensor, magnetic field sensor, infrared sensor.

The image of the surroundings of the motor vehicle is based on an acquisition of the surroundings of the motor vehicle by means of the one or by means of the plurality of surroundings sensors.

DRAWING

Design examples of the disclosure are shown in the drawings and explained in more detail in the following description.

Figure 2:
Figure 3:
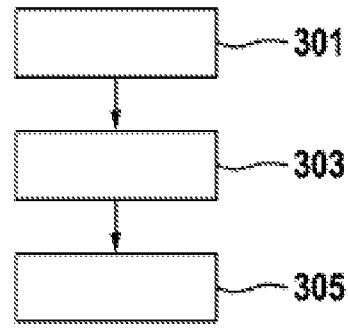
Figure 4:
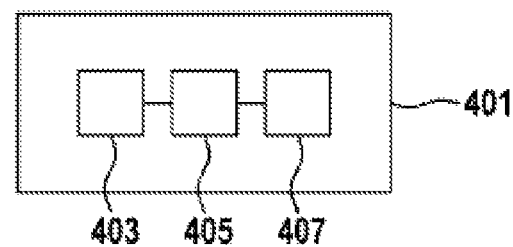
Figure 5:
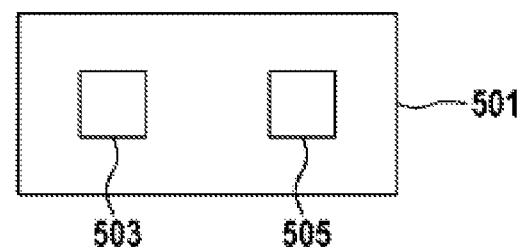
Figure 6:
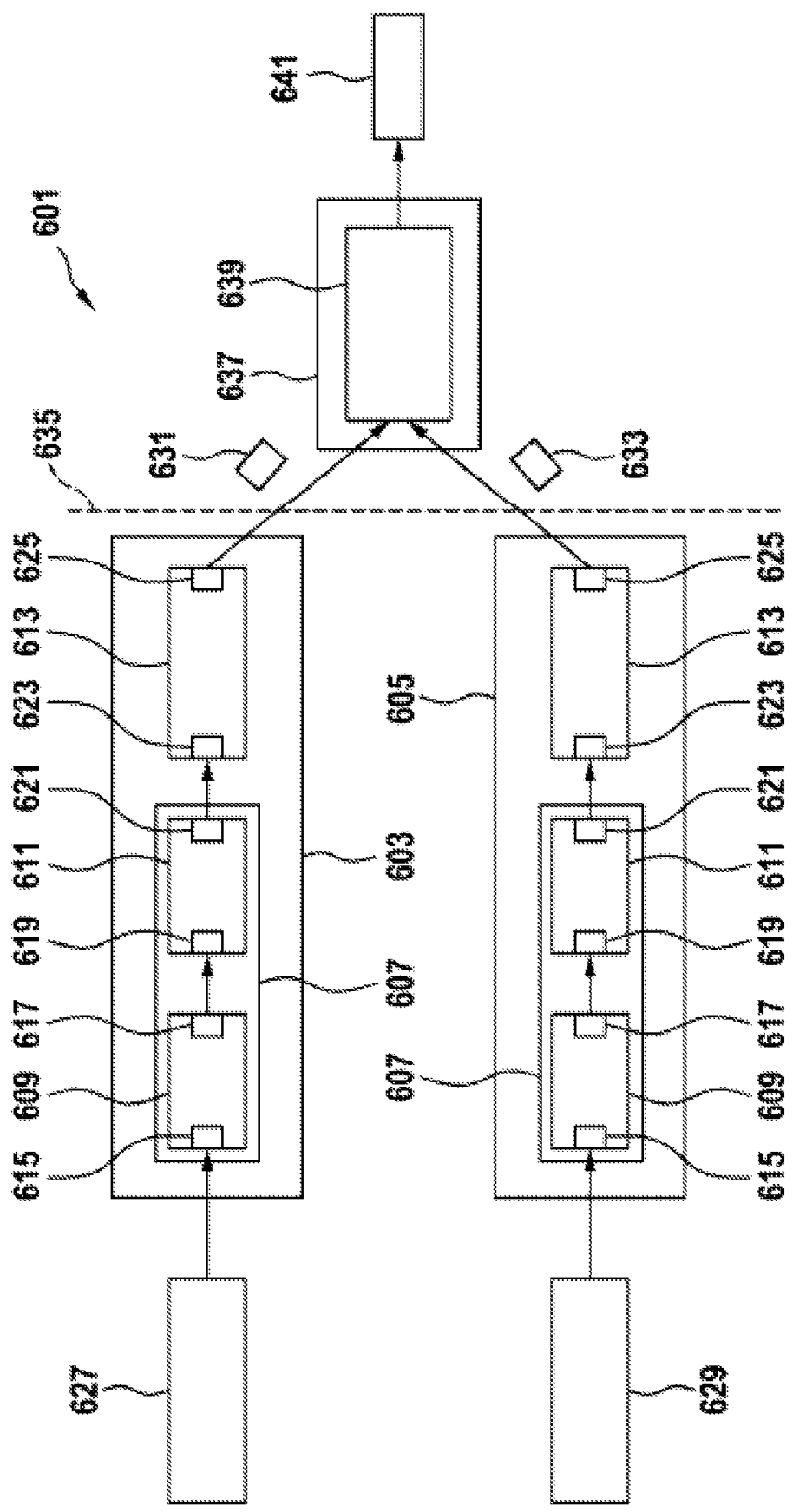

The figures show:

FIG. 1 a flowchart of a method for training an artificial neural network,

FIG. 2 an artificial neural network,

FIG. 3 a flowchart of a method for extracting a feature from an image of surroundings of a motor vehicle, FIG. 4 a device, FIG. 5 a machine-readable storage medium and FIG. 6 a block diagram.

DETAILED DESCRIPTION

In the following, the same reference signs can be used for the same features.

FIG. 1 shows a flowchart of a method for training an artificial neural network, comprising the following steps: receiving 101 training data signals comprising training data for training the artificial neural network, wherein the training data comprises first image data of a first image of an infrastructure and second image data of a second image of the infrastructure, wherein the first image comprises a first feature and wherein the second image comprises a second feature corresponding to the first image, wherein the training data comprises a relative target translation and a relative target rotation between the first feature and the second feature, training 103 the artificial neural network on the basis of the training data, wherein the training comprises the following steps:
 extracting 105 the first feature from the first image and the second feature from the second image by means of the artificial neural network, wherein the extracted first feature is represented by first feature data having a first data volume and wherein the extracted second feature is represented by second feature data having a second data volume,
 ascertaining 107 a relative translation and a relative rotation between the extracted first feature and the extracted second feature by means of the artificial neural network,
 wherein the artificial neural network is trained until a loss function that is dependent on the pose of the feature and on the first and/or second data volume is at a minimum or is less than or less than or equal to a predefined loss function threshold value.

FIG. 2 shows an artificial neural network 201 trained by the method according to the first aspect.

FIG. 3 shows a flowchart of a method for extracting a feature from an image of surroundings of a motor vehicle, comprising the following steps:
 receiving 301 image data signals which represent image data of an image of the surroundings of the motor vehicle,
 extracting 303 a feature from the image by means of the artificial neural network according to claim 8,
 outputting 305 feature signals which represent the extracted feature.

In one embodiment, it is provided that the extracted feature is sent to a remote server via a communication network.

According to one embodiment, the communication network includes a wireless and/or a wired communication network.

According to one embodiment, a wireless communication network includes a WLAN communication network and/or a cellular network.

FIG. 4 shows a device 401.

The device 401 is configured to carry out all steps of the method according to the first aspect and/or according to the third aspect.

The device 401 comprises an input 403, which is configured to receive the training data signals and/or the image data signals.

The device 401 comprises a processor 405, which is configured to train the artificial neural network on the basis of the training data and/or extract a feature from the image by means of the artificial neural network.

The processor 405 is in particular configured to carry out the steps included in training the artificial neural network.

The device 401 comprises an output 407, which is configured to output the feature signals and/or output training result signals representing the trained artificial neural network.

FIG. 5 shows a machine-readable storage medium 501.

A computer program 503 is stored on the machine-readable storage medium 501. The computer program 503 comprises instructions that, when the computer program 503 is executed by a computer, prompt said computer to carry out a method according to the first aspect and/or according to the third aspect.

An artificial neural network 505 according to the second aspect is stored on the machine-readable storage medium 501.

In a not depicted embodiment, it is provided that only the computer program 503 or only the artificial neural network 505 is stored on the machine-readable storage medium.

FIG. 6 shows a block diagram 601.

The block diagram 601 includes a first functional block 603 and includes a second functional block 605.

The two functional blocks 603, 605 are identical.

The first functional block 603 is implemented in a first device according to the third aspect, for example.

The second functional block 605 is implemented in a second device according to the third aspect, for example.

The first device is integrated in a first motor vehicle, for example.

The second device is integrated in a second motor vehicle, for example.

Both functional blocks 603, 605 respectively comprise an artificial neural network 607.

The artificial neural network 607 is trained according to the method according to the first aspect.

The artificial neural network 607 comprises a convolutional neural network 609, hereinafter abbreviated as CNN.

The artificial neural network 607 comprises a fully connected network 611, hereinafter abbreviated as FCN.

Both functional blocks 603, 605 respectively comprise a quantizer 613.

The CNN 609 comprises a first input 615 and comprises a first output 617.

The FCN 611 comprises a second input 619 and comprises a second output 621.

The quantizer 613 comprises a third input 623 and comprises a third output 625.

The first output 617 is connected to the second input 619.

The second output 621 is connected to the third input 623.

First image data 627 is provided to the first input 615 according to the first functional block 603. The first image data 627 represents a first image of a first surroundings of the first motor vehicle.

Second image data 629 is provided to the first input 615 according to the second functional block 605. The second image data 629 represents a second image of a second surroundings of the second motor vehicle.

According to one embodiment, the first and the second surroundings can overlap.

The respective artificial neural network 607 extracts one respective feature from the two images, which is provided according to the third input 623 of the corresponding quantizer 613 according to the first functional block 603 and according to the second functional block 605.

The respective quantizer 613 quantizes the extracted features in such a way that the first and the second feature data which represent the corresponding extracted features are integers.

The quantized features are output by means of the output 625 of the respective quantizer 613.

The third output 625 of the quantizer 613 according to the first functional block 603 outputs a first quantized extracted feature 631.

The third output 625 of the quantizer 613 according to the second functional block 605 outputs a second quantized extracted feature 633.

In the block diagram 601, there is a drawn vertical dashed line 635.

This symbolizes that the two quantized extracted features 631, 633 are sent from the respective motor vehicles to a remote server 637 via a communication network.

The server 637 comprises a further artificial neural network 639 which, according to one embodiment, can be a further FCN.

The two quantized extracted features 631, 633 are aligned by means of the further artificial neural network 639 in order to determine a relative rotation and a relative translation with respect to these two features.

The determined relative translation and the determined relative rotation define a pose 641 of the feature.

Among other things, the here-described concept in particular has the advantage that the extracted features can be represented in a compact manner, which leads to lower requirements in terms of data transfer.

It is therefore in particular an advantage that an efficient data rate is made possible.

The here-described concept furthermore in particular has the advantage that the extracted features can be stored efficiently, because they require less memory space than raw data, for instance, which, for example, represents raw images of the surroundings.

This, for example, produces the technical advantage that a server which processes and stores the extracted features requires less memory space and/or less computing capacity.

The invention claimed is:

1. A method for training an artificial neural network comprising:
   receiving training data signals comprising training data for training the artificial neural network, the training data comprises first image data of a first image of an infrastructure and second image data of a second image of the infrastructure, the first image comprises a first feature, and the second image comprises a second feature corresponding to the first image, the training data further comprises a relative target translation and a relative target rotation between the first feature and the second feature;
   training the artificial neural network based on the training data, the training comprises:
      extracting the first feature from the first image using the artificial neural network, and
      extracting the second feature from the second image using the artificial neural network, the extracted first feature is represented by first feature data having a first data volume, and the extracted second feature is represented by second feature data having a second data volume;
   ascertaining a relative translation and a relative rotation between the extracted first feature and the extracted second feature using the artificial neural network; and
   training the artificial neural network until a loss function that is dependent on a pose of the feature and on the first data volume and/or the second data volume is at a minimum or is less than or less than or equal to a predefined loss function threshold value.

2. The method according to claim 1, wherein:
   the artificial neural network comprises a CNN (convolutional neural network ("CNN") and a fully connected network ("FCN"),
   an output of the CNN is connected to an input of the FCN, and
   the first image data and the second image data are provided to an input of the CNN.

3. The method according to claim 1, wherein the extracted first and second features are quantized such that the first feature data and the second feature data are integers.

4. The method according to claim 1, wherein:
   the loss function is defined by the following mathematical equation: $L_{total}=L_{pose}+L_{data\ volume}$,
   $L_{total}$ is the loss function,
   $L_{pose}$ is another loss function related to the pose of the feature, and
   $L_{data\ volume}$ is a further loss function related to the first data volume of the first feature data and/or related to the second data volume of the second feature data.

5. The method according to claim 4, wherein:
   $L_{data\ volume}=\gamma\mathbb{E}[H(z)]$,
   $\gamma$ is a first parameter,
   $\mathbb{E}$ is an expected value,
   z is the first and/or second feature data, and
   H(z) is the first and/or second data volume.

6. The method according to claim 4, wherein:
   $L_{pose}=\mathbb{E}[|\Delta t_{target}-\Delta t_{determined}|_2]+\beta I\mathbb{E}[|\Delta q_{target}-\Delta q_{determined}|_2]$,
   $\mathbb{E}$ is an expected value,
   $\Delta t_{target}$ is the relative target translation,
   $\Delta t_{determined}$ is the relative translation,
   $\beta$ is a hyperparameter,
   $\Delta q_{target}$ is the relative target rotation, and
   $\Delta q_{determined}$ is the relative rotation.

7. The method according to claim 4, wherein:
   $L_{pose}=\mathbb{E}[|\Delta t_{target}-\Delta t_{determined}|_1]e^{-s_t}+s_t+\mathbb{E}[|\Delta q_{target}-\Delta q_{determined}|_1]e^{-s_q}+s_q$,
   $\mathbb{E}$ is an expected value,
   $\Delta t_{target}$ is the relative target translation,
   $\Delta t_{determined}$ is the relative translation,
   $\Delta q_{target}$ is the relative target rotation,
   $\Delta q_{determined}$ is the relative rotation,
   $s_t$ is a second parameter, and
   $s_q$ is a third parameter.

8. An artificial neural network trained by the method according to claim 1.

9. A method for extracting a feature from an image of surroundings of a motor vehicle, comprising:
   receiving image data signals which represent image data of an image of the surroundings of the motor vehicle;
   extracting the feature from the image using the artificial neural network according to claim 8; and
   outputting feature signals which represent the extracted feature.

10. A device configured to perform the method according to claim 1.

11. The method according to claim 1, wherein a computer program includes instructions that, when the computer program is executed by a computer, prompt the computer to carry out the method.

12. The method according to claim 11, wherein the computer program is stored on a non-transitory machine-readable storage medium.

\* \* \* \* \*